March 6, 1934.    H. S. BERGEN    1,949,707
WEIGHING SCALE
Filed April 10, 1933    2 Sheets-Sheet 1

INVENTOR.
Harry S. Bergen
BY Swan, Tyre & Hardesty
ATTORNEYS

March 6, 1934. H. S. BERGEN 1,949,707
WEIGHING SCALE
Filed April 10, 1933 2 Sheets-Sheet 2
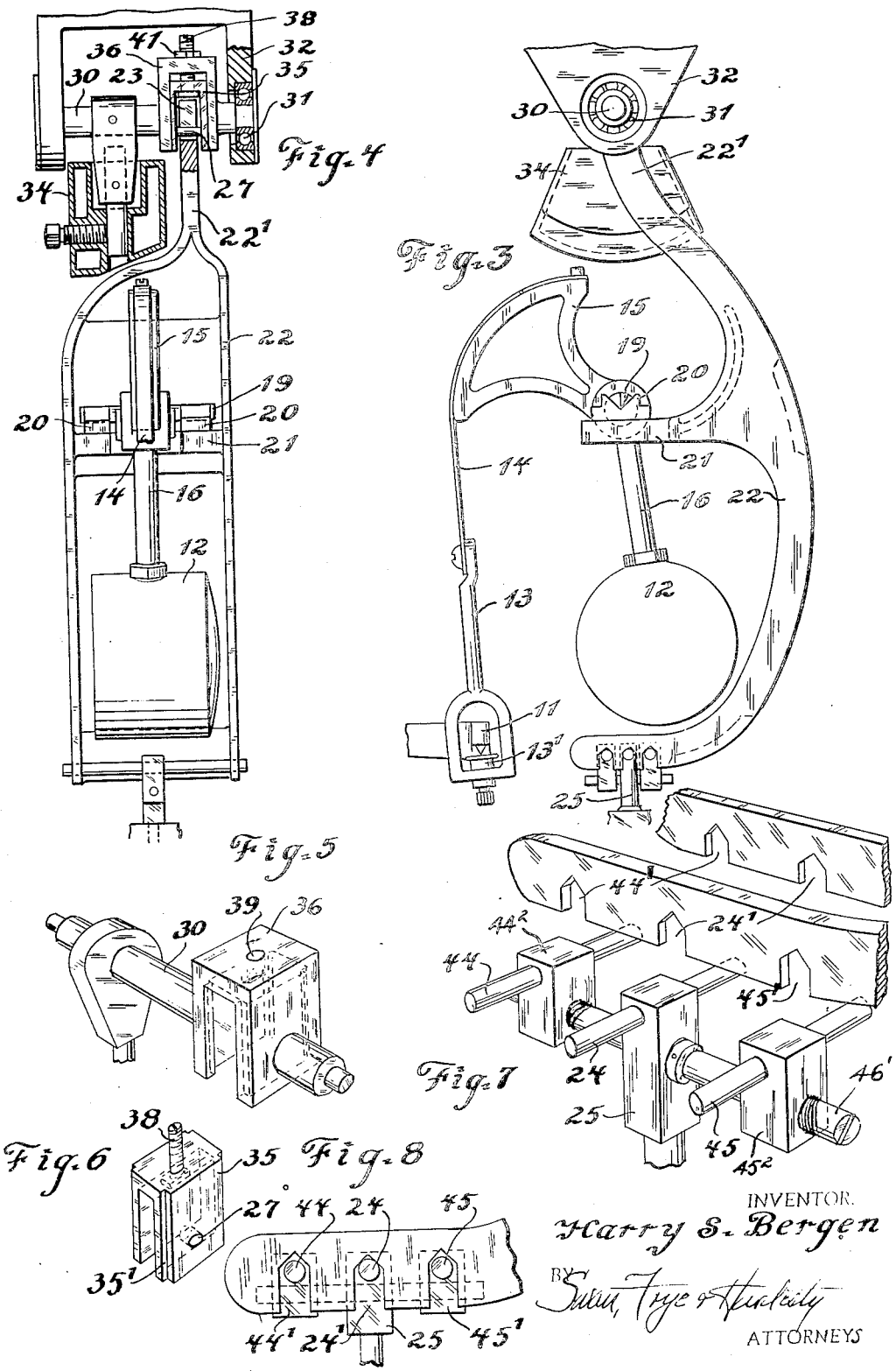
INVENTOR.
Harry S. Bergen
BY
ATTORNEYS Patented Mar. 6, 1934

1,949,707

UNITED STATES PATENT OFFICE 1,949,707

WEIGHING SCALE

Harry S. Bergen, Akron, Ohio

Application April 10, 1933, Serial No. 665,389

19 Claims. (Cl. 265—61)

This invention relates to weighing scale constructions, and more particularly to scales of the pendulum type, and in which the load is supported by a platform carried by one or more levers.

It has heretofore been regarded as essential that in use the supporting framework of such scales be maintained level, as in ordinary pendulum scale constructions any tilting of the scale from the level position introduces inaccuracies by so affecting the reading as to ordinarily change the point of zero indication and at times render the other readings too high or too low over the entire range of the scale. This invention has for an important object, therefore, provision of means for automatically correcting the indications of such a scale when in an out-of-level position, so that it may provide accurate weight registration at zero indication and which corrects and compensates for improper leveling of the scale in either direction in such manner that the readings furnished by the scale remain accurate throughout.

Another important object of the invention is the provision of means whereby, in a weighing scale including a pendulum actuated by a strap passing over an eccentric, the lowermost point at which the strap meets the eccentric for a given weight indication may be kept constant despite varying out-of-level positions of the scale.

Still another object is the provision of an improved and automatically adjustable mounting for the pendulum of such a weighing scale whereby such mounting is automatically moved in response to tilting of the scale to reposition the pendulum.

A further object is the provision of an improved rack rod mounting for a scale utilizing rack and pinion indicator driving means, such as the usual cylinder scale.

Other objects and advantages will be apparent from the following description wherein reference is made to the accompanying drawings illustrating a preferred embodiment of my invention, and wherein similar reference numerals designate similar parts throughout the several views.

In the drawings:

Figure 3 is a front elevation of the pendulum mounting and out-of-level compensating means;

Figure 4 is a side view, looking from the left and partly in vertical section, of the mechanism shown in Figure 3;

Figures 5 and 6 are perspective views of portions of the actuating and adjusting mechanism of the out-of-level compensating means;

Figure 7 is a perspective view of a suitable support for the main lever of the out-of-level compensating mechanism, fragmentarily showing the spaced lower end portions of the lever, and Figure 8 is a side elevational view of the parts shown in Figure 7, with the end portions of the lever in one of the positions assumed thereby.

Figure 1:
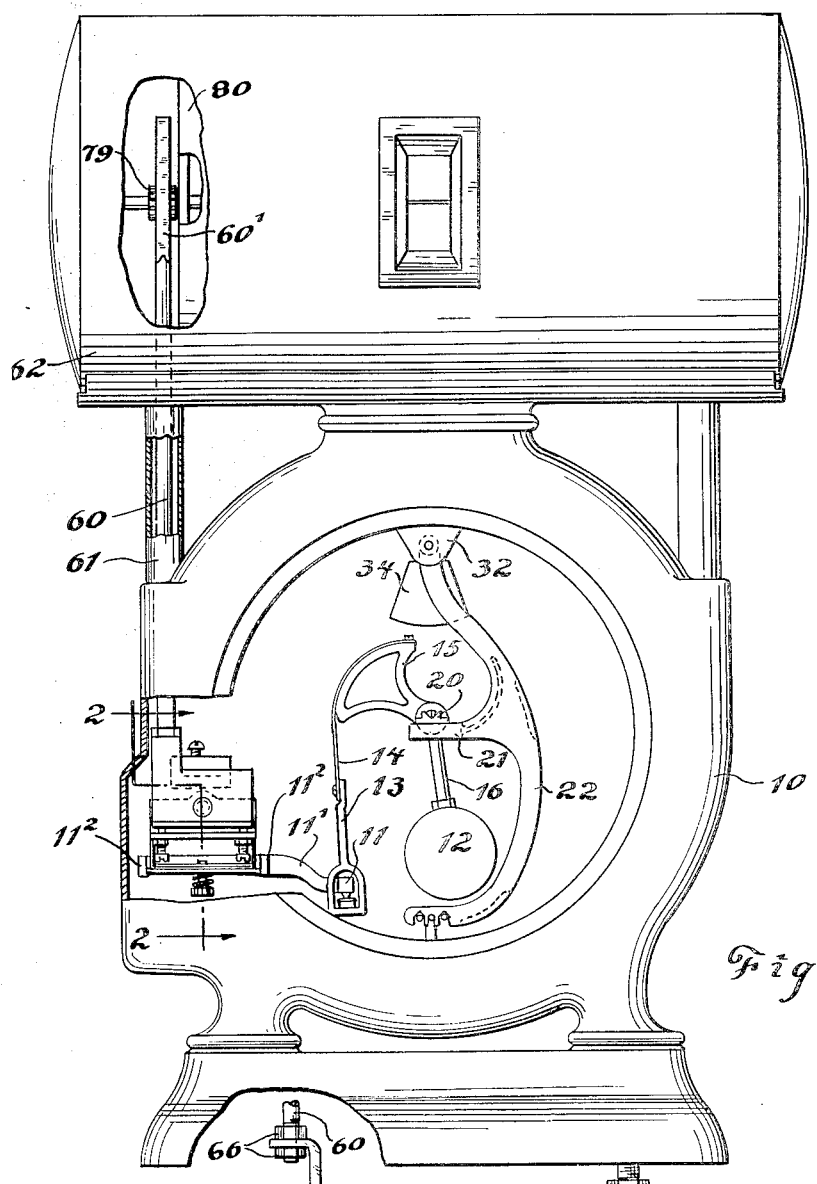
Figure 1 is a rear elevational view, partly broken away, of a weighing scale of the cylinder type incorporating the principles of my invention.

Referring now to the drawings, reference character 10 designates the frame of a weighing scale, shown as of a familiar cylinder type, although it will become readily apparent that my invention is equally adaptable to scales of other types and that in general the details of the load-carrying and weight-indicating mechanisms are immaterial and entirely optional, and they are accordingly not illustrated herein.

In the arrangement shown, when a commodity is being weighed, the nose iron end of the main lever 11 sinks, and its downward movement is resisted by a pendulum 12 adjustably mounted on the stem 16. An eccentric 15 is rigidly connected to the pendulum stem 16, forming the other arm of a bellcrank assembly to which the main lever 11 is connected by a flexible strap or ribbon 14, the lower end of the ribbon being coupled to the nose iron of the main lever by a stirrup 13. The effective length of the upper arm of the bellcrank (constituted by the eccentric 15) is varied in accordance with the load on the scale by virtue of the eccentricity of the part 15, in accordance with the well-known method of rendering more uniform the indicia carried by the dial.

Thus far the construction will be seen to be quite conventional, as is also the manner of supporting the pendulum assembly (15—16) upon knife-edge pivots trunnioned in V-blocks 20 of agate or the like (Figures 3 and 4). Ordinarily, however, the supporting bearings equivalent to those herein designated 20 are rigidly carried by the frame of the scale. When the scale is tilted so as to rock these bearings about their axes, that is, to the right or left as viewed in Figure 1, (when the scale is slightly out of level in either such direction) the pendulum weight 12 tends, under the influence of gravity, to maintain its position, and so to sink or rise with relation to the frame of the scale. Such tendency, assuming a constant load on the scale, results in an actual movement of the pendulum sufficient to render the scale markedly inaccurate, even though it may be only slightly out of level, by changing from its proper position the lowermost point of engagement of the ribbon 14 and eccentric 15 for any given weight as well as at the zero setting.

To reestablish the proper relative positioning of the pendulum and point of engagement of the ribbon and eccentric, whenever the scale may be out of level in either direction, by moving the eccentric in the proper direction and to an extent proportional to the degree to which the scale is out of level, is the primary object of this invention, and to that end I support the bearing blocks 20 upon intermediate projecting lugs 21 carried by the legs of the bifurcated supporting lever 22 fulcrumed at its lower end upon a post 25 carried by the frame of the scale (the details of this fulcrum support will be hereinafter described). The arms of the lever 22 converge above the lugs 21 to form a single extension 22' of the lever, which extension is slotted at its upper extremity, as at 23 (Figure 4), to provide a yoke for the reception of a pin 27, adjustably mounted in an offset portion of the mounting for the correcting pendulum 30, as best shown in Figure 4. The pin 27 not only holds the supporting lever 22 in position with sufficient rigidity to permit normal and undisturbed movement of the counterbalancing pendulum 12 during ordinary scale operations, but being located in a vertical plane other than that of the pivot shaft 30, it serves to shift the entire lever assembly 22 and so the bearings 20, pendulum 12 and bellcrank (15—16) laterally and controllingly to adjust the lowermost point of engagement of the ribbon 14 and eccentric 15, whenever the scale assumes an out-of-level position.

The crank pin 27 is adjustably carried by the pivot shaft 30, preferably mounted in anti-friction bearings, as 31, arranged in brackets 32 rigidly carried by the frame of the scale. A weight 34 is rigidly secured to and hangs from the shaft 30, and the pin 27 is preferably adjustably slidable with the slotted block 35 (note Figures 5 and 6) housed and guided in the slot of the eccentrically arranged supporting frame 36 herein shown as integrally formed with the shaft 30. A slideway for the slidable block 35 is formed in the eccentric frame 36 by the inner surfaces of the latter and preferably by inturned side edges which engage rabbeted corners, as 35', of the slide block 35. An adjusting screw 38 is rotatable but not longitudinally movable in the slide block 35 and is threaded in a suitably tapped aperture as 39 in the top of the eccentric frame 36, (see Figure 5) through which it extends, and projects from the top of the block 36 where it is provided with a lock nut as 41, (see Figure 4) the screw being slotted at its upper end for easy manipulation by means of a screwdriver or the like. It will be seen that by means of the adjusting screw 38 the throw of the crank pin 27 may be adjusted, and set at any desired point. As herein shown, the axis of the crank pin 27 is below that of the shaft 30, so that when the shaft 30 is turned by swinging movement of the hanging weight 34 with relation to the frame of the scale, the crank pin is moved and so the lever assembly 22 shifted in the same direction as weight 34 swings.

Considering the corrective operation produced by the thus effected movement of the bearing blocks 20 supported on lever 22, and so of the entire pendulum and eccentric assembly, it should be noted that when the scale is in position for accurate weighing the stirrup bearing 13', which in effect is the lower extremity of the ribbon 14, is closer to a vertical plane extended through the centers of bearing blocks 20 than is the lowermost point of engagement of the ribbon 14 with the eccentric 15. In other words, the ribbon 14 is angularly inclined away from the pendulum weight 12 toward the upper extremity of the pendulum assembly. This inclination of the ribbon (note Figure 3) is sufficient so that despite the decreasing radius of the eccentric 15 toward its upper extremity, the ribbon remains slightly inclined when the scale is fully loaded. It will accordingly be appreciated that by reason of this inclination, movement of the pendulum assembly bodily to the left, (as viewed in Figure 3) will tend to lengthen the unengaged portion of the ribbon while increasing its angle of inclination from the nose iron 11, and with the position of the nose iron substantially unchanged in position and the pendulum assembly free to swing the effect will be a pulling of the eccentric downward and consequent swinging the pendulum weight 12 counter-clockwise (upward), while restoring the ribbon to its original position. Such movement of the eccentric to the left, moreover, will be seen to be precisely the movement produced by my compensating mechanism when the scale is tilted to the left, as by raising the right side of the scale as viewed in Figures 1 and 3. The gravity-induced effect of tilting the scale to the left would cause the pendulum weight 12 to swing downward (clockwise) and the eccentric 15 to swing upward, (also clockwise) if the compensating mechanism were not present, thereby winding the ribbon upon the eccentric. The corrective pull upon the ribbon which is induced by moving the eccentric to the left so as to increase the angle of inclination of the ribbon and so lengthen the distance between the point of engagement of eccentric 15 and ribbon 14 and the nose iron bearing 13' produces a compensating swinging of the pendulum assembly by which the ribbon unwinds from the eccentric, and the pendulum weight 12 is caused to rise.

The extent to which the eccentric 15 is so compensatingly displaced in response to tilting of the scale will be seen to depend upon the throw of the crank pin 27, which is subject to adjustment by the adjusting screw 38. The extent of corrective movement induced by tilting the scale may thus be made to exactly coincide with the degree to which the scale indication would otherwise be rendered inaccurate, by so adjusting the crank throw of pin 27 by means of the screw 38 that the scale holds its accuracy of reading at zero no matter how the scale is tilted, by maintaining always the same lowermost point of engagement between eccentric and ribbon regardless of out-of-level conditions of the scale. Of course the farther the scale is tilted the farther the lever 22 is shifted in the same direction, by the tendency of the weight 34 to remain plumb.

The reverse corrective operation when the scale is tilted in the oposite direction, (that is, to the right as viewed in the drawings) will be readily understood. The movement of the eccentric 15 to the right induced by the swinging of the corrective weight 34 and so of the supporting lever 22 in the same direction, tends by reason of the tendency to lessen the inclination of the ribbon 14 to shorten the distance between the nose iron bearing 13' and the lowermost point of engagement of the ribbon and eccentric. This tends to unwind the ribbon from the eccentric, and gives a slight slack in the ribbon permitting the pendulum weight 12 to fall, whereby the lowermost point of engagement of the ribbon and eccentric is returned to its original position.

To maintain the fulcrum of the supporting lever 22 substantially in vertical alignment with the shaft 30 and bearings 20 and to insure movement of the eccentric toward or away from the nose iron as desired (in accordance with the direction of tilting) when the bellcrank and pendulum assembly is correctively shifted, a plurality of fulcrum bearings may be provided at the foot of the lever 22 in addition to the single pin 24.
As best shown in Figures 7 and 8, I have provided for this purpose a pair of similar fulcrum pins, as 44, 45, one on each side of and spaced from the pin 24, each pin entering alined appropriately positioned notches in the bifurcations of the lever, and each pin being supported upon the post 25, and designated at 24', 44', 45', respectively. However, the upper walls of the central notches may be somewhat lower than the others, or the pin 24 somewhat higher, so that the lever may be free to rock slightly in either direction about the central bearing pin before engaging either of the others, although it will be seen that when rocked far enough in either direction it will ride onto one of the outer bearing pins (44—45) and during any continued movement pivot entirely thereon while the upper walls of the other two notches are free from their respective pins.

The notches 44'—45' are materially wider than their respective pins, and adjusting means may be provided for moving the pins laterally to shift their axes and so change the positioning of the fulcrum of lever 22 when engaged with either of these outer pins, the upper end of each notch being pointed as shown or otherwise suitably shaped to always center the lever in the same manner with respect to the supporting pin. Adjustment as well as support of the pins 44—45 is provided by the screw-threaded rod 46' journaled in post 25 but not longitudinally movable relatively thereto. Opposite ends of the rod 46' carry threads of opposite pitch, and the supporting blocks $44^2$—$45^2$ by which the pins 44—45 are supported respectively are tapped to fit the screw rod, along which they may be made to travel (in opposite directions) by turning the rod, as will be readily apparent.

Figure 2:
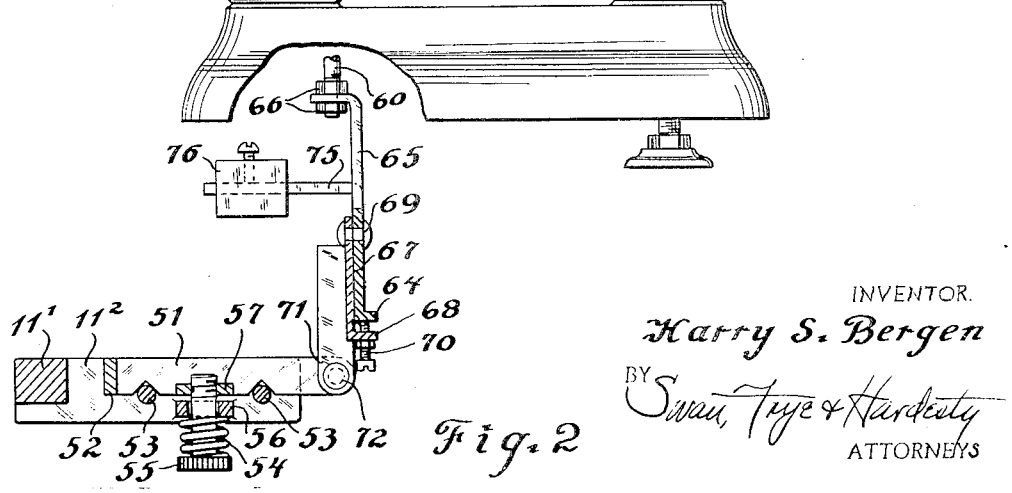
Figure 2 is a detail vertical section taken substantially on the line 2—2 of Figure 1 and looking in the direction of the arrows.

As best shown in Figure 1, the main lever 11 is provided with a lateral extension 11', rearwardly from which branch a pair of parallel nose arms $11^2$, adapted to yieldably support a nose-iron 51 carrying the rack rod 60. The nose-iron 51 is also provided with a pair of arms, one lying adjacent and projecting from each of the arms $11^2$ of the lever, and the two arms of the nose-iron are tied by crossbars 52 and 57 and yieldably held in contact with the positioning pins 53 carried by the arms $11^2$ by means of a spring 54, engaging at one end against the head of a screw 55 and at the other against a cross bar 56 extending between and shown cast integrally with the arms $11^2$ of the lever. As shown in Figure 2, the screw 55 projects loosely through the bar 56 and is threaded into the cross-bar 57 of the nose-iron 51.

The rack rod is pivotally connected to the nose-iron 51 by connecting means presently to be described, and extends upwardly through a tube 61 into the cylinder casing 62, where it may be provided with a rack portion as 60' or other suitable means for actuating the indicating cylinder 80 through a pinion 79. The lower end of the rack rod is adjustably secured to the plate 65, as by having its threaded lower extremity extend through an apertured bent portion thereof and locked in position by means of jamb nuts 66. The rod-carrying plate 65 is pivotally secured to the supporting plate 67, as by means of a loose rivet 69, in such manner that the plate 65 and so the rack rod may be swung about an axis extending longitudinally of the scale. Adjusting and locking screws 70 are provided for controllingly effecting such rocking movement of the rack rod plate, and for securing the same in desired positions. A pair of adjusting screws are shown tapped in a rearwardly extending bottom flange 68 carried by the supporting plate 67 which is provided with downwardly projecting ears 71 pivotally attached to the rearwardly extending arms of the nose iron 51, as by means of pivots 72. A projecting arm 75 of the plate 65 carries a weight 76 which constantly urges the rack rod 60 in the proper direction to hold it in mesh with the cylinder driving pinion 79.

It will be seen that in event of a sudden or unduly severe load upon the scale, which might strain the teeth of the rack and pinion, the spring 54 would be compressed, allowing the arms $11^2$ and so the main lever to continue their descent, the nose-iron 51 leaving the forward positioning pin 53 and so cushioning the movement imparted to the rack rod, which is then more gradually drawn to the new position by the spring 54 until the nose-iron is again seated upon both positioning pins 53 in the proper position for accurate weight indication. The adjustment made possible by the manner of pivoting the rack rod plate 65 upon the nose-iron plate 67 by means of the rivets 69, and the manner in which the positioning of the rack rod with respect to this axis may be effected by means of the screw 70, makes the constant maintenance of a proper perpendicular positioning of the rack rod with respect to the base of the scale a simple matter, while the manner in which the rack rod is overweighted and a yieldable nose-iron support furnished will also be seen to be of extreme simplicity while maintaining cushioned yet accurate positioning of these important parts.

The many advantages incident to the provision of a scale with my improved compensating mechanism will be readily apparent to those skilled in the art. Slight changes of scale leveling caused by warping or sagging of a counter upon which the scale stands, or of the floor under the counter, cannot render the scale inaccurate as is ordinarily the case with pendulum scales. Moreover the correction is fully automatic yet simple and positive, and introduces no elements requiring special attention or likely to get out of order, and is effective over so wide a range that it makes possible the use of portable scales, for example, equipped with my improved compensating means, in positions in which ordinary scales would be utterly incapable of furnishing accurate weight indication. Whatever their type, scales equipped in the disclosed manner may be freely moved about without the necessity of any regard being paid to accurate leveling.

By maintaining the same starting point of lowermost engagement between ribbon and eccentric in any level or out-of-level position of the scale, I insure a constant zero indication in all such positions, and because equal increments of loads placed on the scale platform will then always swing the eccentric so as to unwind the ribbon from the same portions of the eccentric the indications will remain uniformly correct throughout the entire range of weights, regardless of the level or out-of-level conditions of the scale.

While it will be apparent that the illustrated embodiment of my invention herein disclosed is well calculated to fulfill the objects and advantages primarily set forth, it is to be understood that the invention is susceptible to variation, modification and change within the spirit and scope of the subjoined claims.

What I claim is:

1. In a weighing scale having a frame and a load-offsetting pendulum, means movable relatively to the frame for supporting the pendulum, and means including a member movable in the relative direction of application of the force of gravity upon changes in the position of the frame and connected to the first mentioned means for shifting the position of the pendulum in response to changes in position of the frame.

2. In a weighing scale having a frame and a load-offsetting pendulum, a mounting for the pendulum movable relatively to the frame, and means including a member pivoted on the frame and engaging said pendulum mounting for shifting the position of the pendulum in response to changes in position of the frame.

3. In a weighing scale having a frame and a load-offsetting pendulum, a mounting for the pendulum movable relatively to the frame and means including a member pivoted on the frame for movement in the relative direction of application of the force of gravity upon changes in the position of the frame, and a connection between said means and the pendulum mounting for shifting the position of the pendulum in response to changes in position of the frame.

4. In a weighing scale having a frame and a load-offsetting pendulum, a movable support for the pendulum, and means carried by the frame for automatically moving said support to reposition the pendulum to compensate for changes in position of the frame.

5. In a weighing scale having a frame and a load-offsetting pendulum, a movable support for the pendulum, and means including a member pivotally mounted on the frame and engaging said support for automatically moving said support to reposition the pendulum to compensate for changes in lateral tilting of the scale frame.

6. In a weighing scale having a frame and a load-offsetting pendulum, a lever fulcrumed upon the frame and supporting the pendulum, and means carried by the frame and engaging the lever for automatically swinging said lever upon changes in the position of the frame whereby the pendulum is repositioned to compensate for changes in lateral tilting of the scale frame.

7. In a weighing scale having a frame and a load-offsetting pendulum, a lever fulcrumed upon the frame and supporting the pendulum, a weight pivoted upon the frame to swing in the relative direction of application of the force of gravity upon changes in the position of the frame, and a connection between the weight and lever for swinging the lever to reposition the pendulum in response to changes in position of the frame.

8. In a weighing scale having a frame and a load-offsetting pendulum, a lever fulcrumed upon the frame and supporting the pendulum, a weighted lever pivoted upon the frame and engaging the pendulum-supporting lever, whereby movement of the weighted lever in response to changes in lateral tilting of the scale frame will serve to alter the position of the pendulum.

9. In a weighing scale having a frame and a load-offsetting pendulum, a lever fulcrumed upon the frame and supporting the pendulum, a weighted lever pivoted upon the frame and engaging the pendulum-supporting lever, whereby movement of the weighted lever in response to changes in lateral tilting of the scale frame will serve to alter the position of the pendulum, and means for fulcruming said supporting lever in substantially vertical alignment with the weighted lever regardless of tilting of the scale frame.

10. In a weighing scale having a frame and a load-offsetting pendulum, a lever fulcrumed upon the frame and supporting the pendulum, a weighted lever pivoted upon the frame and engaging the pendulum supporting lever, whereby movement of the weighted lever in response to changes in lateral tilting of the scale frame will serve to alter the position of the pendulum, and means for fulcruming the pendulum supporting lever at a plurality of points whereby the fulcrums of the two levers are in substantially vertical alignment in various tilted positions of the scale frame.

11. In a weighing scale having a frame and a load-offsetting pendulum, bearings in which the pendulum is pivoted, a lever carrying the pendulum bearings, a hanging weight pivoted on the frame, and a connection between said weight and said lever for swinging the lever in response to changes in lateral tilting of the scale frame to thereby shift the position of the pendulum bearings.

12. In a weighing scale having a frame and a load-offsetting pendulum, bearings in which the pendulum is pivoted, a lever carrying the pendulum bearings, a hanging weight pivoted on the frame, and a connection between said weight and said lever for swinging the lever in response to changes in lateral tilting of the scale frame to thereby shift the position of the pendulum bearings, and means for fulcruming the lever in substantially vertical alignment with the pendulum bearings and hanging weight in various tilted positions of the scale frame.

13. In a weighing scale having a frame and load-offsetting mechanism including a pendulum and a lever system, a supporting member pivotally mounted on the frame and carrying bearings in which the pendulum is pivoted, an eccentric carried by the pendulum, a flexible ribbon for actuating the pendulum from the lever system and contacting various areas of the eccentric as the pendulum is swung to offset various loads, and means carried by the scale frame and engaging said pendulum-supporting member for automatically shifting the position of the pendulum assembly to maintain constant the areas of contact between ribbon and eccentric at all weight-offsetting positions of the pendulum regardless of changes in lateral tilting of the scale frame.

14. In a weighing scale having a frame and load-offsetting mechanism including a pendulum and a lever system, a supporting member pivotally mounted on the frame and carrying bearings in which the pendulum is pivoted, an eccentric carried by the pendulum, a flexible ribbon for actuating the pendulum from the lever system and contacting various areas of the eccentric as the pendulum is swung to offset various loads, and a hanging weight pivoted on the frame and engaging said supporting member to shift the position of the pendulum in response to changes in lateral tilting of the scale frame to thereby maintain constant the areas of contact between ribbon and eccentric at all weight-offsetting positions of the pendulum regardless of changes in lateral tilting of the scale frame.

15. In a weighing scale having a frame and load-offsetting mechanism including a pendulum and a lever system, a supporting member pivotally mounted on the frame and carrying bearings in which the pendulum is pivoted, an eccentric carried by the pendulum, a flexible ribbon for actuating the pendulum from the lever system and contacting various areas of the eccentric as the pendulum is swung to offset various loads, and a weighted lever pivoted on the scale frame and movable in the relative direction of application of the force of gravity upon changes in lateral tilting of the scale frame, and a connection between the weighted lever and supporting member for shifting the position of the pendulum in response to changes in lateral tilting of the frame to thereby maintain constant the areas of contact between ribbon and eccentric at all weight-offsetting positions of the pendulum regardless of changes in lateral tilting of the scale frame.

16. In a weighing scale having a frame and a load-offsetting pendulum, a lever fulcrumed upon the frame and supporting the pendulum, a shaft pivotally mounted in the frame, a weight secured to and depending from the shaft, a crank carried by the shaft, and means carried by the crank and engaging said lever to swing the lever upon changes in the position of the frame whereby the pendulum is repositioned to compensate for changes in tilting of the scale frame.

17. In a weighing scale having a frame and a load-offsetting pendulum, a lever fulcrumed upon the frame and supporting the pendulum, a shaft pivotally mounted in the frame, a weight secured to and depending from the shaft, a crank carried by the shaft, and a pin adjustably secured within the crank and engaging said lever to swing the lever upon changes in the position of the frame whereby the pendulum is repositioned to compensate for changes in tilting of the scale frame.

18. In a weighing scale having a lever system and weight-offsetting mechanism and indicating mechanism both operated from the lever system, a connection between the lever system and the indicating mechanism including a yoke yieldingly carried upon the lever, a plate pivotally mounted upon the yoke, a second plate carried by the first mentioned plate and pivoted at right angles to the connection with the yoke, means for retaining the second mentioned plate in various adjusted positions relatively to the first mentioned plate, and a rack rod carried by the second plate.

19. In a weighing scale having a lever system, load-offsetting mechanism actuated from the lever system, and a cylindrical weight indicating mechanism also actuated from the lever system, a connection between the lever system and indicating mechanism comprising a member cushioningly mounted upon the lever system, a base plate pivotally mounted upon said member, an adjusting plate pivotally secured on the base plate at substantially right angles to the connection of the base plate to said member, means for adjusting the angular position of the adjusting plate relatively to the base plate, a rack rod adjustably mounted upon the adjusting plate, and a pinion carried by the indicating mechanism and meshing with the rack of said rod.

HARRY S. BERGEN.